US007916132B2

(12) United States Patent
Lee

(10) Patent No.: US 7,916,132 B2
(45) Date of Patent: Mar. 29, 2011

(54) SYSTEMS FOR DISPLAYING IMAGES AND RELATED METHODS

(75) Inventor: Szu-Hsien Lee, Kaohsiung (TW)

(73) Assignee: Chimei Innolux Corporation, Miao-Li County (TW)

( * ) Notice: Subject to any disclaimer, the term of this patent is extended or adjusted under 35 U.S.C. 154(b) by 830 days.

(21) Appl. No.: 11/842,285

(22) Filed: Aug. 21, 2007

(65) Prior Publication Data

US 2008/0068365 A1 Mar. 20, 2008

(30) Foreign Application Priority Data

Sep. 18, 2006 (TW) ............................... 95134431 A

(51) Int. Cl.
*G06F 3/038* (2006.01)
*G09G 5/00* (2006.01)
*H05B 37/02* (2006.01)
*H05B 39/04* (2006.01)
*H05B 41/36* (2006.01)

(52) U.S. Cl. ......................... 345/211; 345/204; 315/219

(58) Field of Classification Search ........... 345/204–215
See application file for complete search history.

(56) References Cited

U.S. PATENT DOCUMENTS

2002/0117972 A1* 8/2002 Ito et al. ........................ 315/219
2002/0145599 A1* 10/2002 Endo et al. .................... 345/211
2003/0117387 A1* 6/2003 Hung et al. .................... 345/211
2007/0040825 A1* 2/2007 Mamba et al. ................ 345/211

* cited by examiner

*Primary Examiner* — Sumati Lefkowitz
*Assistant Examiner* — Charles Hicks
(74) *Attorney, Agent, or Firm* — Thomas|Kayden

(57) ABSTRACT

A representative AC signal generating circuit includes a first capacitor, a second capacitor, a first switch, a second switch, a third switch and a fourth switch. The first capacitor is coupled between a first node and an AC signal. The second capacitor is coupled between a second node and the AC signal. The first switch is coupled between the first node and a first DC signal. The second switch is coupled between the second node and a second DC signal. The third switch is coupled between the first node and an output terminal. The fourth switch is coupled between the second node and the output terminal. The first switch and the fourth switch are synchronous, the second switch and the third switch are synchronous and the first switch and the second switch are asynchronous.

20 Claims, 7 Drawing Sheets

60

SYSTEMS FOR DISPLAYING IMAGES AND RELATED METHODS

BACKGROUND OF THE INVENTION

1. Field of the Invention

The invention relates to AC signal generating circuits.

2. Description of the Related Art

While conventional black liquid crystal displays provide high contrast and wide viewing angle, driving circuits thereof normally integrated in a driving IC require high driving voltages. However, the driving voltage provided by the driving IC is limited by a processing voltage grade, with costs increased accordingly. Thus, it becomes more and more important to provide higher driving voltages associated with the limited processing voltage grades.

In this regard, FIG. 1 shows a conventional AC signal generating circuit 10, comprising capacitor C, resistor R1 and output terminal 11. Capacitor C is coupled between output terminal 11 and AC voltage signal VCOM. Resistor R1 is coupled between output terminal 11 and DC signal Vdc. Using a capacitive coupling method, the voltage of output terminal 11 comprises a DC voltage component from DC signal Vdc and an AC voltage component from the AC voltage signal VCOM.

FIG. 2 is a timing diagram of AC voltage signal VCOM, DC signal Vdc and AC voltage signal VCOMP of output terminal 11 of AC signal generating circuit 10 in FIG. 1. AC voltage signal VCOM is output through capacitor C to output terminal 11 and DC voltage signal Vdc is output through resistor R1 to output terminal 11. The voltage of output terminal 11 is changed by adjusting DC voltage signal Vdc and AC voltage signal VCOM. Voltage amplitude A is voltage amplitude of AC voltage signal VCOM or voltage amplitude of AC voltage signal VCOMP.

BRIEF SUMMARY OF THE INVENTION

Systems for displaying images and related methods are provided. In this regard, an embodiment of a system comprises an AC signal generating circuit. The AC signal generating circuit comprises a first capacitor coupled between a first node and an AC signal, a second capacitor coupled between a second node and the AC signal, a first switch coupled between the first node and a first DC signal, a second switch coupled between the second node and a second DC signal, a third switch coupled between the first node and an output terminal and a fourth switch coupled between the second node and the output terminal. The first switch and the fourth switch are synchronous, the second switch and the third switch are synchronous and the first switch and the second switch are asynchronous.

Another embodiment of a system for generating an AC signal comprises: an AC signal generating circuit comprising a first capacitor coupled between a first node and an AC signal, a second capacitor coupled between a second node and the AC signal, a first switch coupled between the first node and a first DC signal, a second switch coupled between the second node and a second DC signal, a third switch coupled between the first node and an output terminal, and a fourth switch coupled between the second node and the output terminal; wherein: during a first period, the AC signal generating circuit is operative to turn on the second switch and the third switch and turn off the first switch and the fourth switch such that voltage of the first node is transmitted through the third switch to the output terminal, and a second DC signal is transmitted through the second switch to the second node;

and during a second period, the AC signal generating circuit is operative to turn off the second switch and the third switch and turn on the first switch and the fourth switch such that voltage of the second node is transmitted through the fourth switch to the output terminal, and a first DC signal is transmitted through the first switch to the first node.

An embodiment of a method for driving an AC signal generating circuit, the AC signal generating circuit comprising a first capacitor coupled between a first node and an AC signal, a second capacitor coupled between a second node and the AC signal, a first switch coupled between the first node and a first DC signal, a second switch coupled between the second node and a second DC signal, a third switch coupled between the first node and an output terminal, and a fourth switch coupled between the second node and the output terminal, the method comprising: providing the AC signal to the first capacitor and the second capacitor; providing the first DC signal through the first switch to the first node; and providing the second DC signal through the second switch to the second node; wherein the first switch and the fourth switch are synchronous, the second switch and the third switch are synchronous and the first switch and the second switch are asynchronous.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
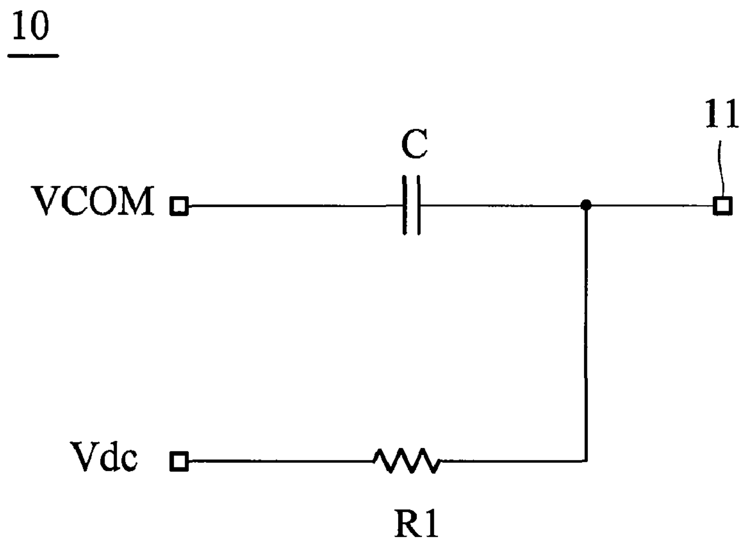
FIG. 1 shows a conventional AC signal generating circuit.
Figure 2:
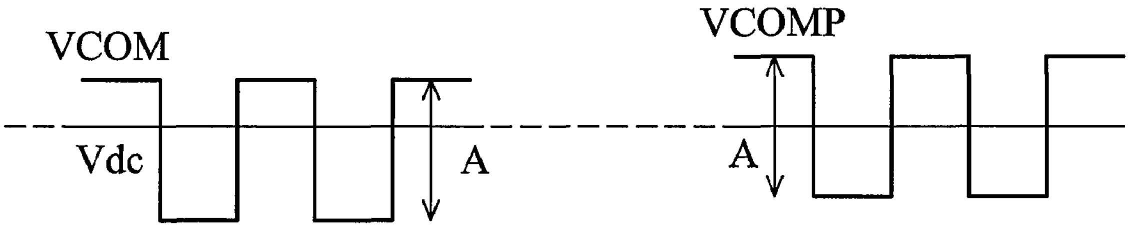
FIG. 2 is a timing diagram of AC voltage signal VCOM, DC signal Vdc and AC voltage signal VCOMP.
Figure 3:
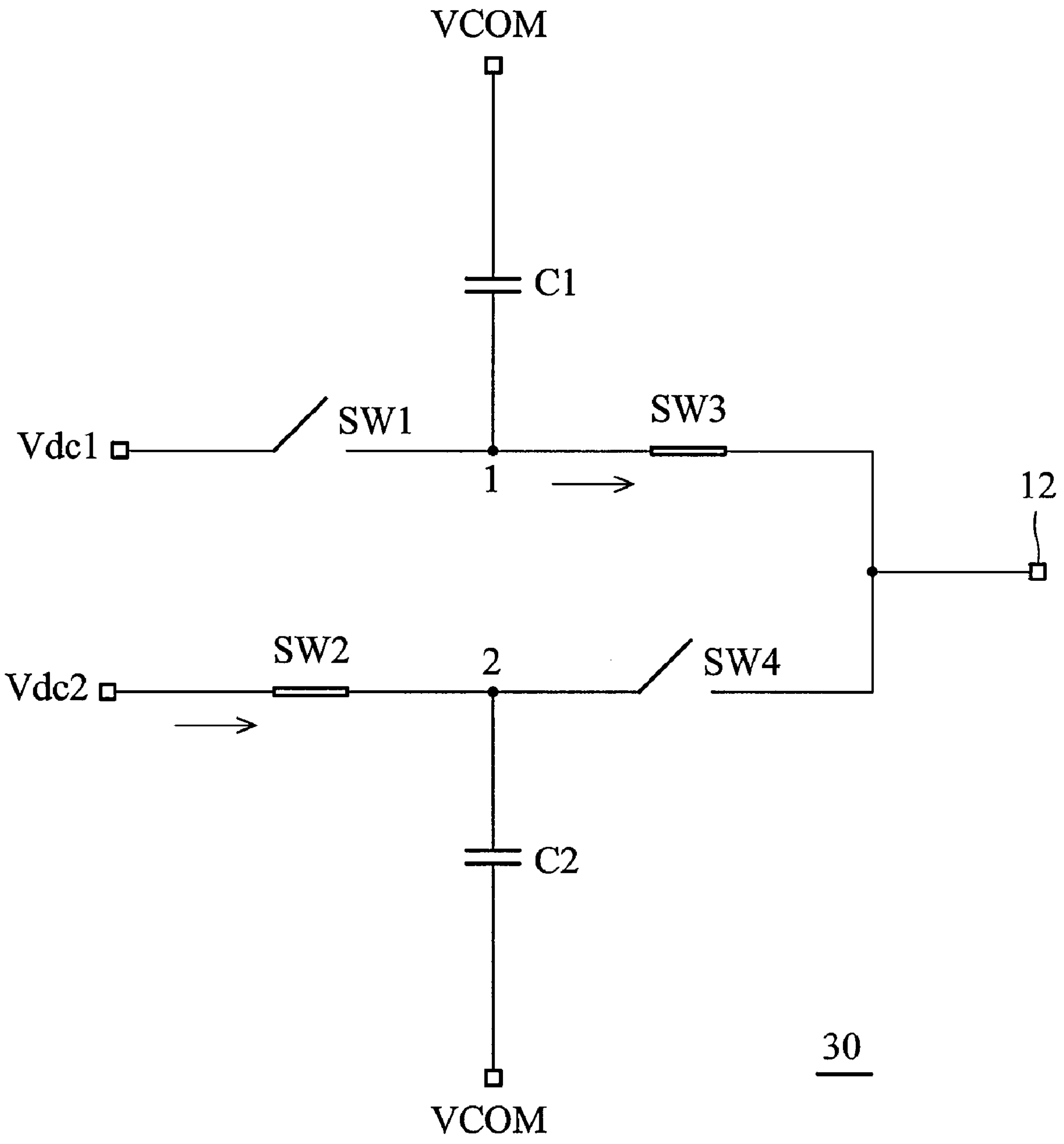
FIG. 3 is a schematic diagram of a first state of the AC signal generating circuit according to an embodiment of the invention.

FIG. 3 is a schematic diagram of a first state of AC signal generating circuit 30 according to an embodiment of the invention. AC signal generating circuit 30 provides a wide range AC voltage to a display panel. AC signal generating circuit 30 comprises first capacitor C1, second capacitor C2, first switch SW1, second switch SW2, third switch SW3 and fourth switch SW4. First capacitor C1 is coupled between first node 1 and AC signal VCOM. Second capacitor is coupled between second node 2 and AC signal VCOM. First switch SW1 is coupled between first node 1 and first DC signal Vdc1. Second switch SW2 is coupled between second node 2 and second DC signal Vdc2. Third switch SW3 is coupled between first node 1 and output node 12. Fourth switch SW4 is coupled between second node 2 and output node 12. Each of first switch SW1, second switch SW2, third switch SW3 and fourth switch SW4 may comprise a switch transistor. The switch transistor may comprise a P-type transistor and an N-type transistor. In addition, first capacitor C1 and second capacitor C2 are between 1 μF and 4 μF, and first DC voltage Vdc1 and second DC voltage Vdc2 are between 1 and 5 v.

As shown in FIG. 3, first switch SW1 and fourth switch SW4 are turned off simultaneously and second switch SW2 and third switch SW3 are turned on simultaneously. Thus, second DC signal Vdc2 is transmitted through second switch SW2 to second node 2. The voltage of second node 2 equals the voltage of second DC signal Vdc2. The voltage of first node 1 is transmitted through third switch SW3 to output node 12, such that voltage of output node 12 equals the voltage of first node 1.

Figure 4:
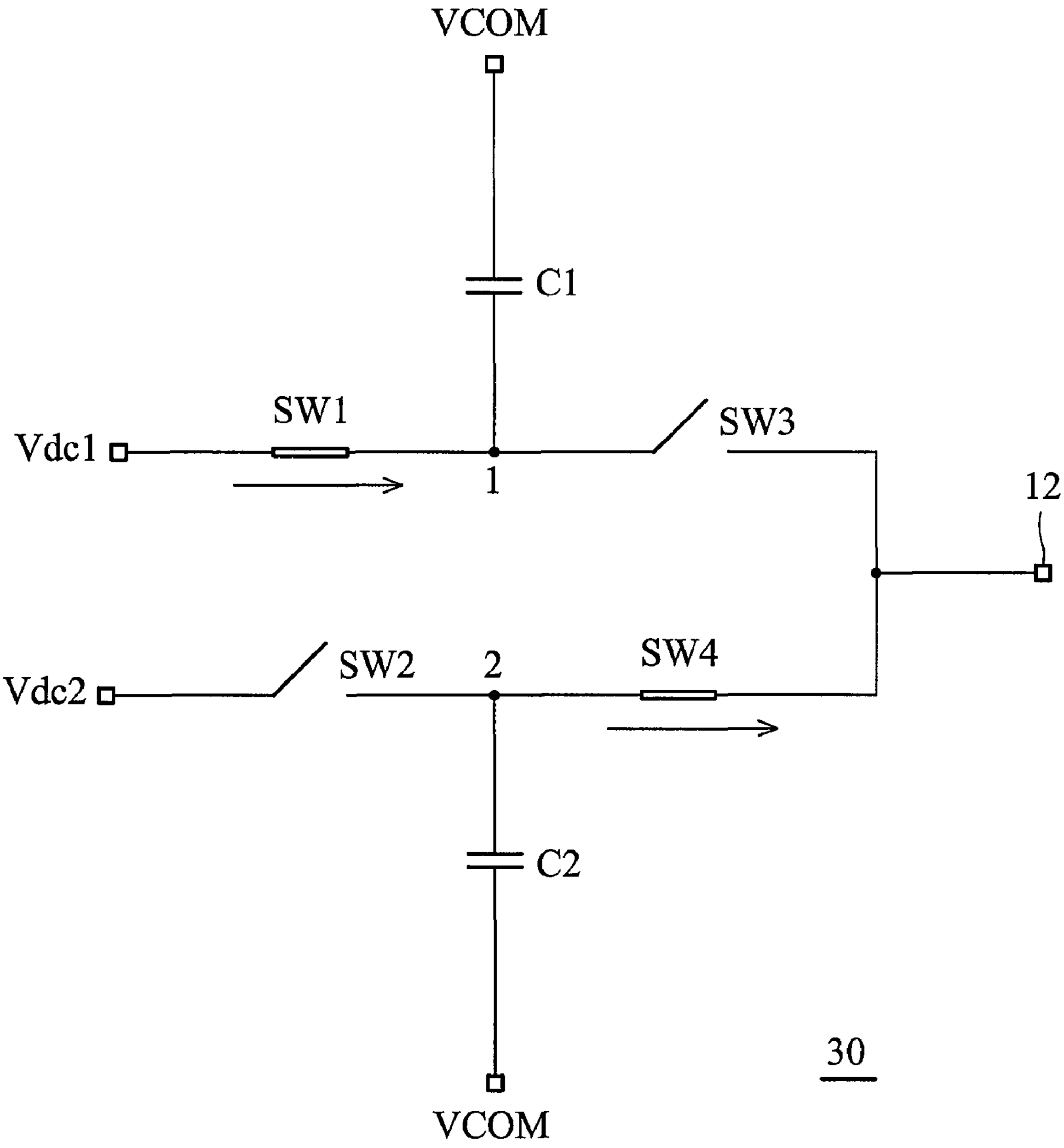
FIG. 4 is a schematic diagram of a second state of the AC signal generating circuit according to an embodiment of the invention.

FIG. 4 is a schematic diagram of the second state of AC signal generating circuit 30 according to an embodiment of the invention. Components of AC signal generating circuit 30 in FIG. 4 are the same as in FIG. 3, differing only in the states of first switch SW1, second switch SW2, third switch SW3 and fourth switch SW4. Each of first switch SW1, second switch SW2, third switch SW3 and fourth switch SW4 may comprise a switch transistor. The switch transistor may comprise a P-type transistor and a N-type transistor.

In FIG. 4, first switch SW1 and fourth switch SW4 are turned on simultaneously and second switch SW2 and third switch SW3 are turned off simultaneously. Thus, first DC signal Vdc1 is transmitted through first switch SW1 to first node 1. The voltage of first node 1 equals the voltage of first DC signal Vdc1. The voltage of second node 2 is transmitted through fourth switch SW4 to output node 12, so the voltage of output node 12 equals the voltage of second node 2.

Figure 5:
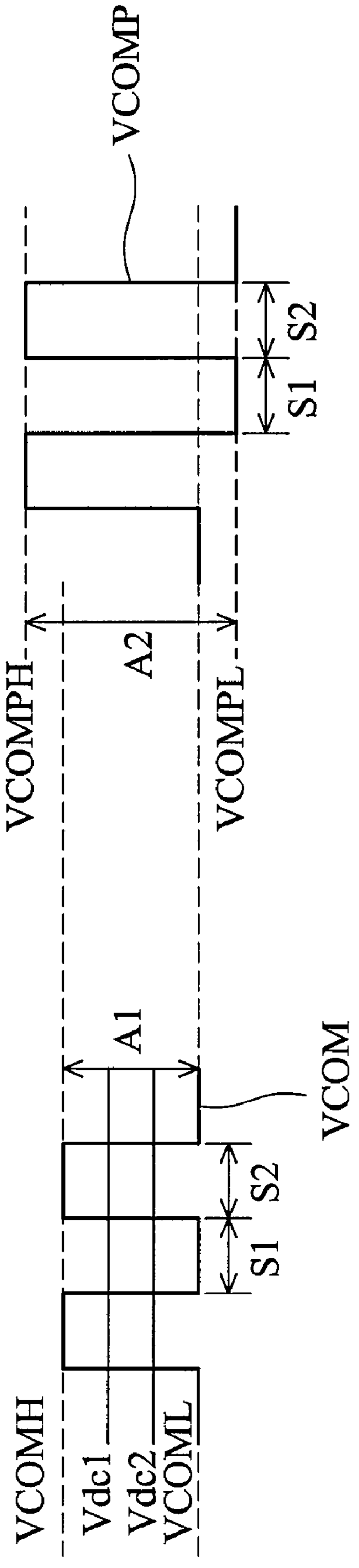
FIG. 5 is a timing diagram of AC voltage signal VCOM, first DC signal Vdc1, second DC signal Vdc2 and AC voltage signal VCOMP according to an embodiment of the invention.

FIG. 5 is a timing diagram of AC voltage signal VCOM, first DC signal Vdc1, second DC signal Vdc2 and AC voltage signal VCOMP of output node 12 according to an embodiment of the invention. When AC signal generating circuit 30 is at the first state S1, first switch SW1 and fourth switch SW4 are turned off simultaneously, and second switch SW2 and third switch SW3 are turned on simultaneously. The voltage of second node 2 equals the voltage of second DC signal Vdc2. The voltage of output node 12 equals the voltage of first node 1. Before entering the first state S1, the voltage of first node 1 equals the voltage of first DC signal Vdc1. Upon entering the first state S1, the cross voltage of first capacitor C1 cannot change immediately. Thus, the voltage of first node 1 is VCOMPL=VCOML−(VCOMH−Vdc1) of which VCOMH and VCOML are respectively the highest voltage and the lowest voltage of AC voltage signal VCOM and VCOMPH and VCOMPL are respectively the highest voltage and the lowest voltage of AC voltage signal VCOMP.

As shown in FIGS. 3, 4, and 5, when AC signal generating circuit 30 is at the second state S2, first switch SW1 and fourth switch SW4 are turned on simultaneously, and second switch SW2 and third switch SW3 are turned off simultaneously. The voltage of first node 1 equals the voltage of first DC signal Vdc1. The voltage of output node 12 equals the voltage of second node 2. Before entering the second state S2 (at the first state S1), the voltage of second node 2 equals the voltage of second DC signal Vdc2. Upon entering the first state S2, the cross voltage of second capacitor C2 cannot be changed immediately. Thus, the voltage of second node 2 is VCOMPH=VCOMH+(Vdc2−VCOML).

As shown in FIG. 5, the voltage amplitude of AC voltage signal VCOM is A1=VCOMH−VCOML. The voltage amplitude of output node 12 is A2=VCOMPH−VCOMPL. Voltage amplitude A1 exceeds voltage amplitude A2. Thus, AC signal generating circuit 30 provides the voltage amplitude of AC voltage signal VCOMP which exceeds the voltage amplitude of AC voltage signal VCOM.

Figure 6:
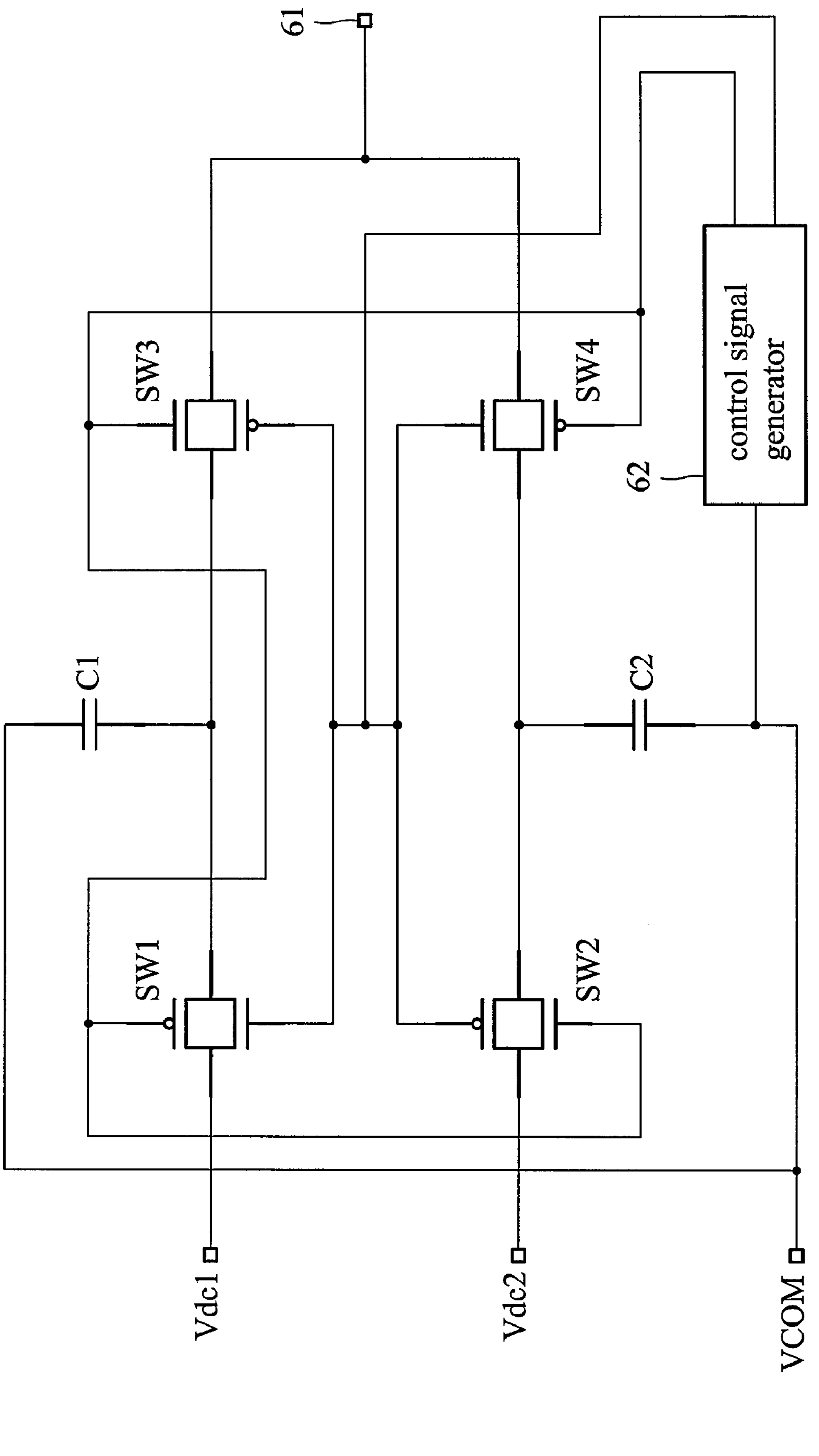
FIG. 6 shows an AC signal generating circuit according to another embodiment of the invention.

FIG. 6 shows AC signal generating circuit 60 according to another embodiment of the invention. AC signal generating circuit 60 comprises first capacitor C1, second capacitor C2, first switch SW1, second switch SW2, third switch SW3, fourth switch SW4 and control signal generator 62. The difference between AC signal generating circuit 60 in FIG. 6 and AC signal generating circuit 30 in FIG. 3 is that control signal generator 62 controls first switch SW1, second switch SW2, third switch SW3 and fourth switch SW4 which are implemented by transmission gates.

In FIG. 6, each transmission gate comprises a P-type transistor and an N-type transistor. Each transmission gate comprises a first terminal, a second terminal, a third terminal and a fourth terminal. The P-type transistor is coupled to the first terminal, the second terminal and the fourth terminal. The N-type transistor is coupled to the first terminal, the third terminal and the fourth terminal. Control signal generator 62 is coupled to the second terminal and the third terminal. Since the operation of AC signal generating circuit 60 in FIG. 6 is similar to the operation of AC signal generating circuit 30 in FIGS. 3 and 4, it is not detailed here.

Figure 7:
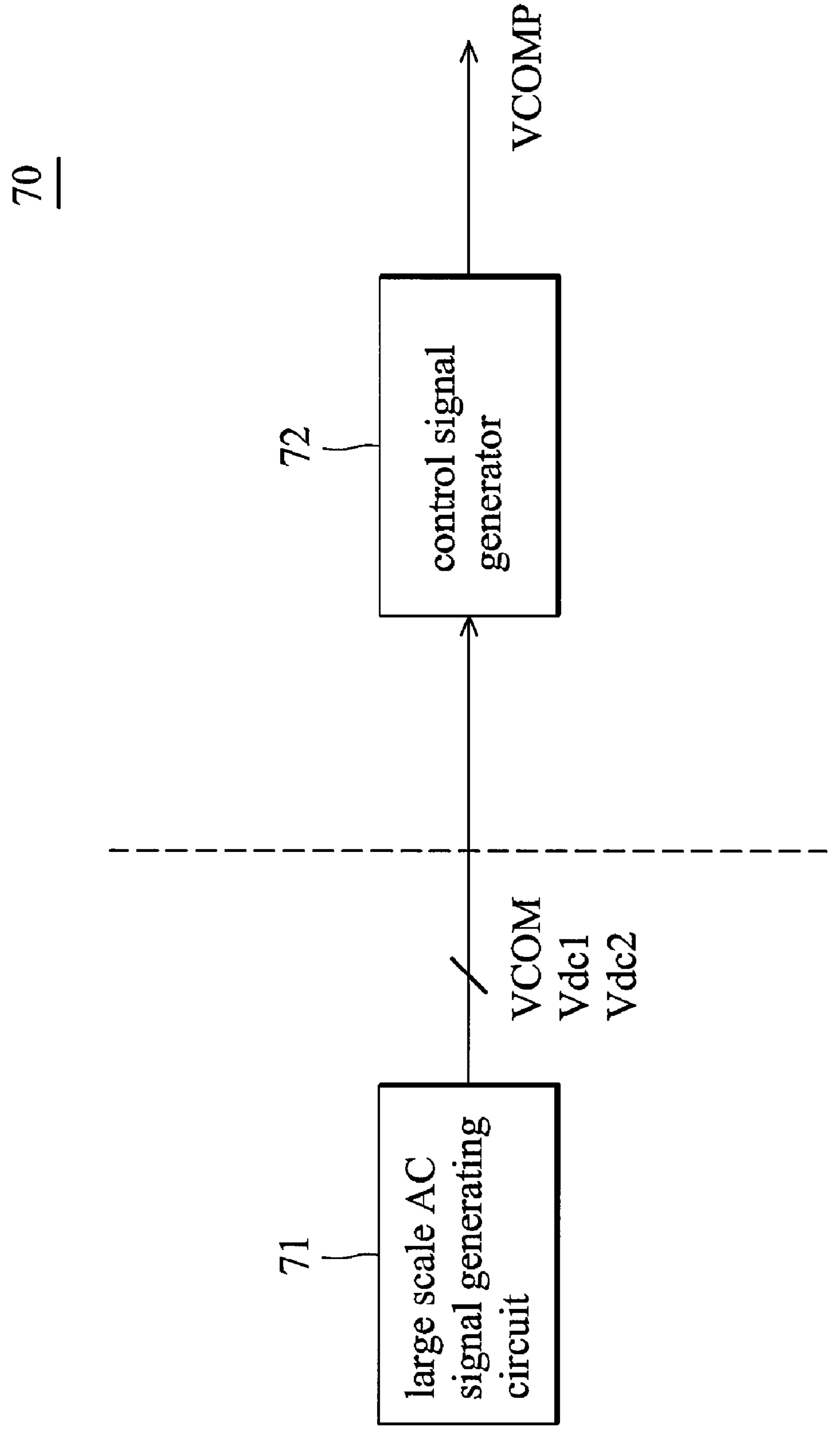
FIG. 7 shows a large scale AC signal generating architecture according to another embodiment of the invention.

FIG. 7 shows large scale AC signal generating architecture 70 according to another embodiment of the invention. Large scale AC signal generating architecture 70 comprises control signal generator 71 and large scale AC signal generating circuit 72. Control signal generator 71 is disposed on the driving IC. Large scale AC signal generating circuit 72 is disposed on the glass panel. Control signal generator 71 is electrically coupled to large scale AC signal generating circuit 72. Control signal generator 71 transmits first DC voltage signal Vdc1, second DC voltage signal Vdc2 and AC voltage signal VCOM to large scale AC signal generating circuit 72. Large scale AC signal generating circuit 72 generates AC voltage signal VCOMP according to first DC voltage signal Vdc1, second DC voltage signal Vdc2 and AC voltage signal VCOM. Due to large scale AC signal generating circuit 72, the driving IC can utilize a process with lower voltage grade, thereby potentially reducing costs.

Figure 8:
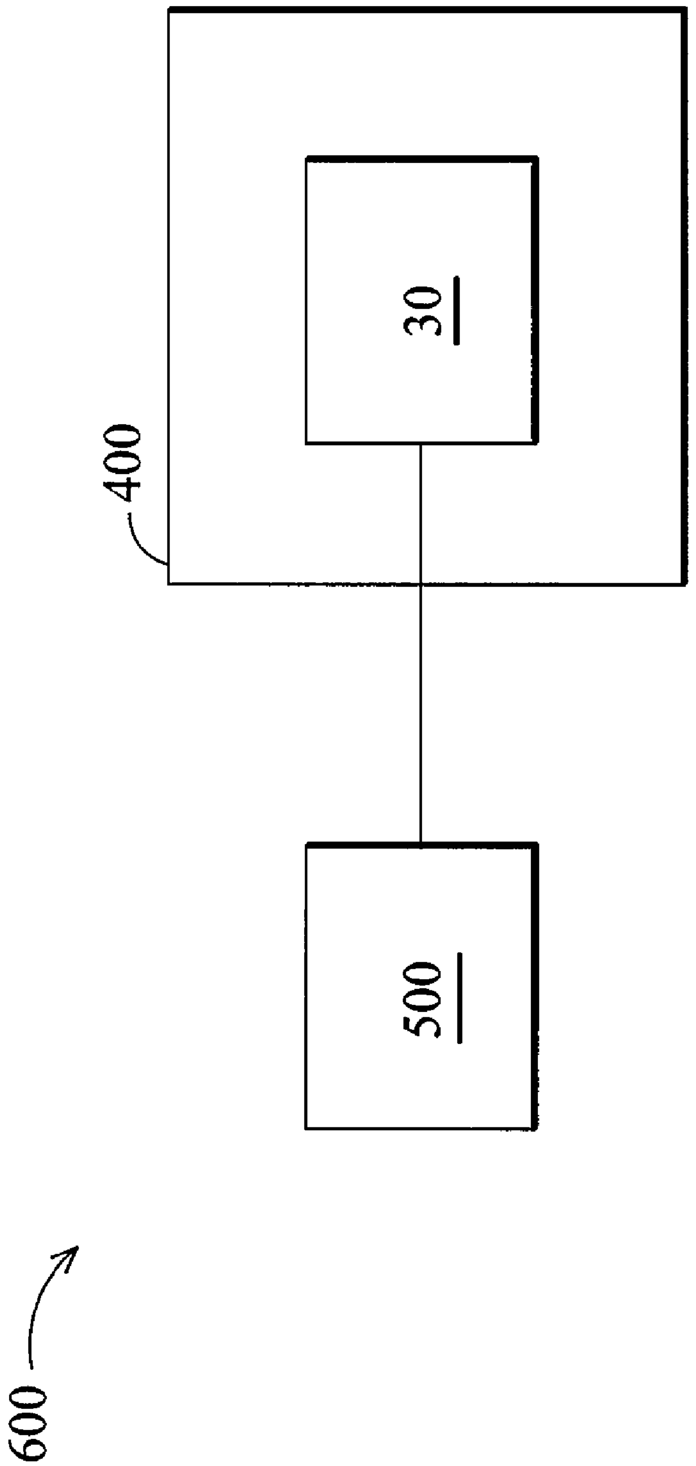
FIG. 8 schematically shows another embodiment of a system for displaying images.

FIG. 8 schematically shows another embodiment of a system for displaying images which, in this case, is implemented as electronic device 600, which incorporates a display panel 400. As shown in FIG. 8, display panel 400 comprises an AC signal generating circuit, such as circuit 30 of FIG. 3, and a power supply 500. Power supply 500 is operatively coupled to display panel 400 and provides power to display panel 400. Electronic device 600 can be a mobile phone, digital camera, PDA (personal data assistant), notebook computer, desktop computer, television, or portable DVD player, for example.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:

an AC signal generating circuit, comprising:

a first capacitor coupled between a first node and an AC signal;

a second capacitor coupled between a second node and the AC signal;

a first switch coupled between the first node and a first DC signal;

a second switch coupled between the second node and a second DC signal;

a third switch coupled between the first node and an output terminal; and a fourth switch coupled between the second node and the output terminal;

wherein the first switch and the fourth switch are synchronous, the second switch and the third switch are synchronous, and the first switch and the second switch are asynchronous.

2. The system as claimed in claim 1, further comprising a control signal generator operative to control the first switch, the second switch, the third switch and the fourth switch.

3. The system as claimed in claim 2, wherein each of the first switch, the second switch, the third switch and the fourth switch comprises a switch transistor.

4. The system as claimed in claim 3, wherein each said switch transistor is a transmission gate comprising a first terminal, a second terminal, a third terminal and a fourth terminal.

5. The system as claimed in claim 4, wherein the control signal generator is coupled to the second terminal and the third terminal.

6. The system as claimed in claim 1, wherein voltage range of the output terminal exceeds voltage range of the AC signal.

7. The system as claimed in claim 1, further comprising a display panel, wherein the AC signal generating circuit forms a portion of the display panel.

8. The system as claimed in claim 7, further comprising an electronic device, wherein the electronic device comprises:

the display panel; and a power supply coupled to and operative to provide power to the display panel.

9. A system for generating an AC signal comprising:

an AC signal generating circuit comprising a first capacitor coupled between a first node and an AC signal, a second capacitor coupled between a second node and the AC signal, a first switch coupled between the first node and a first DC signal, a second switch coupled between the second node and a second DC signal, a third switch coupled between the first node and an output terminal, and a fourth switch coupled between the second node and the output terminal:

wherein:

during a first period, the AC signal generating circuit is operative to turn on the second switch and the third switch and turn off the first switch and the fourth switch such that voltage of the first node is transmitted through the third switch to the output terminal, and a second DC signal is transmitted through the second switch to the second node; and during a second period, the AC signal generating circuit is operative to turn off the second switch and the third switch and turn on the first switch and the fourth switch such that voltage of the second node is transmitted through the fourth switch to the output terminal, and a first DC signal is transmitted through the first switch to the first node.

10. The system as claimed in claim 9, further comprising means for controlling the first switch, the second switch, the third switch and the fourth switch.

11. The system as claimed in claim 9, wherein each of the first switch, the second switch, the third switch and the fourth switch comprises a switch transistor.

12. The system as claimed in claim 11, wherein each said switch transistor is a transmission gate comprising a first terminal, a second terminal, a third terminal and a fourth terminal.

13. The system as claimed in claim 12, further comprising a control signal generator coupled to the second terminal and the third terminal of at least one said switch transistor.

14. The system as claimed in claim 9, wherein output voltage of the output terminal is configured to be applied in a display panel.

15. A method for driving an AC signal generating circuit, the AC signal generating circuit comprising a first capacitor coupled between a first node and an AC signal, a second capacitor coupled between a second node and the AC signal, a first switch coupled between the first node and a first DC signal, a second switch coupled between the second node and a second DC signal, a third switch coupled between the first node and an output terminal, and a fourth switch coupled between the second node and the output terminal, the method comprising:

providing the AC signal to the first capacitor and the second capacitor;

providing the first DC signal through the first switch to the first node; and providing the second DC signal through the second switch to the second node;

wherein the first switch and the fourth switch are synchronous, the second switch and the third switch are synchronous and the first switch and the second switch are asynchronous.

16. The method as claimed in claim 15, further comprising a control signal generator controlling the first switch, the second switch, the third switch and the fourth switch.

17. The method as claimed in claim 16, wherein each of the first switch, the second switch, the third switch and the fourth switch comprises a switch transistor.

18. The method as claimed in claim 17, wherein the switch transistor is a transmission gate comprising a first terminal, a second terminal, a third terminal and a fourth terminal.

19. The method as claimed in claim 18, wherein the transmission gate comprises a P-type transistor coupled to the first terminal, the second terminal and the fourth terminal and a N-type transistor coupled to the first terminal, the third terminal and the fourth terminal.

20. The method as claimed in claim 19, wherein the control signal generator is coupled to the second terminal and the third terminal.

* * * * *